United States Patent [19]

deMey, II et al.

[11] Patent Number: 4,735,505
[45] Date of Patent: Apr. 5, 1988

[54] ASSEMBLY FOR ADJUSTING AN OPTICAL ELEMENT

[75] Inventors: Charles F. deMey, II, West Redding; Igor E. Dolgen, Monroe, both of Conn.

[73] Assignee: The Perkin-Elmer Corporation, Norwalk, Conn.

[21] Appl. No.: 527,885

[22] Filed: Aug. 30, 1983

[51] Int. Cl.⁴ .......................... G01B 9/02; G02B 27/10
[52] U.S. Cl. ..................... 356/345; 350/283; 350/287
[58] Field of Search ............... 356/345, 346, 358, 361, 356/363; 350/280, 283, 287

[56] References Cited

U.S. PATENT DOCUMENTS

| | | | |
|---|---|---|---|
| 2,571,937 | 10/1951 | Peck | 356/346 X |
| 3,450,464 | 6/1969 | Guffon | 350/287 X |
| 3,482,919 | 12/1969 | Barringer | 356/346 |
| 3,601,476 | 8/1971 | Mackenzie | 350/285 |
| 3,664,729 | 5/1972 | Moore | 350/283 X |
| 3,879,112 | 4/1975 | Hickey | 356/345 X |
| 4,265,540 | 5/1981 | Doyle | 356/346 |
| 4,286,877 | 9/1981 | Clarke | 356/346 |
| 4,391,525 | 7/1983 | Woodruff | 356/346 |
| 4,544,272 | 10/1985 | Doyle | 356/346 |

FOREIGN PATENT DOCUMENTS

| | | |
|---|---|---|
| 255831 | 9/1911 | Fed. Rep. of Germany . |
| 2041217 | 2/1972 | Fed. Rep. of Germany . |
| 0940121 | 7/1982 | U.S.S.R. ............................ 350/287 |

OTHER PUBLICATIONS

Spindler und Hoyer Katalog SH 234, 1980, p. 99, Middle, Gottingen.
Soviet Inventions Illustrated, Section Chemical, Week B 16, 4th Jun. 1979, Abstract No. D 5412, R 21, Derwent Publications Ltd., London, GB; & SU-A-610 040 (Boichenko A.F.) 05-05-1978.
Applied Spectroscopy, vol. 34, No. 5, Sep./Oct. 1980, pp. 599-603, Baltimore, US; W. M. Doyle et al.: "Refractively Scanned Interferometers for Fourier Transform Infrared Spectrophotometry".

Primary Examiner—Vincent P. McGraw
Attorney, Agent, or Firm—Edwin T. Grimes; Francis L. Masselle; Thomas P. Murphy

[57] ABSTRACT

An assembly having a compensator plate positional control mechanism includes an optical beamsplitter and a compensator plate which plate is pivoted to vary the pathlength of beams passing therethrough. By varying these pathlengths, the arms of an interferometer can be quite exactly equalized.

3 Claims, 2 Drawing Sheets

ASSEMBLY FOR ADJUSTING AN OPTICAL ELEMENT

BACKGROUND OF THE INVENTION

The present invention generally relates to an assembly for adjusting an optical element and, in particular, relates to an assembly for adjusting a compensator plate in an interferometer.

Optical beamsplitters are widely used in many applications which require two beams of light from a single source. One such use is in an interferometer. In general, an interferometer is an arrangement whereby a single beam of light is separated into two or more parts by partial reflections, the separate beams being subsequently reunited after traversing different optical paths. The reunited beams then produce interference. One practical application of an interferometer is in a Fourier Transform Infrared (FT/IR) Spectrophotometer.

As well known in the interferometer field, a path length compensation plate is usually placed in the path of the transmitted separated beam. This is required since one of the separated beams reflects back through the transparent substrate material of the beamsplitter whereas the other separated beam follows a different path. Generally, the compensator plate, in order to equalize the path length, is positioned parallel to the beamsplitter substrate and, additionally, is made to precisely the same thickness as the beamsplitter substrate.

The precision required for the thickness matching of the compensation plate and beamsplitter substrate becomes more apparent when it is recognized that each of the separated beams traverses a separate optical path two times. Hence, any errors due to mismatched pathlengths caused by thickness differences are doubled.

Meeting these positional and thickness requirements is exceedingly difficult and frequently prohibitively expensive in instruments designed for very precise measurements.

SUMMARY OF THE INVENTION

Accordingly, one object of the present invention is to provide an assembly for adjusting an optical element, such as a compensator plate.

This object is accomplished, at least in part, by providing a means for adjusting the angle of a compensator plate with respect to a light beam impinging thereon.

Other objects and advantages will become apparent to those skilled in the art from the following detailed description read in conjunction with the appended claims and the drawing attached hereto.

BRIEF DESCRIPTION OF THE DRAWING

The drawing, not drawn to scale, includes.

DETAILED DESCRIPTION OF THE INVENTION

Figure 1:
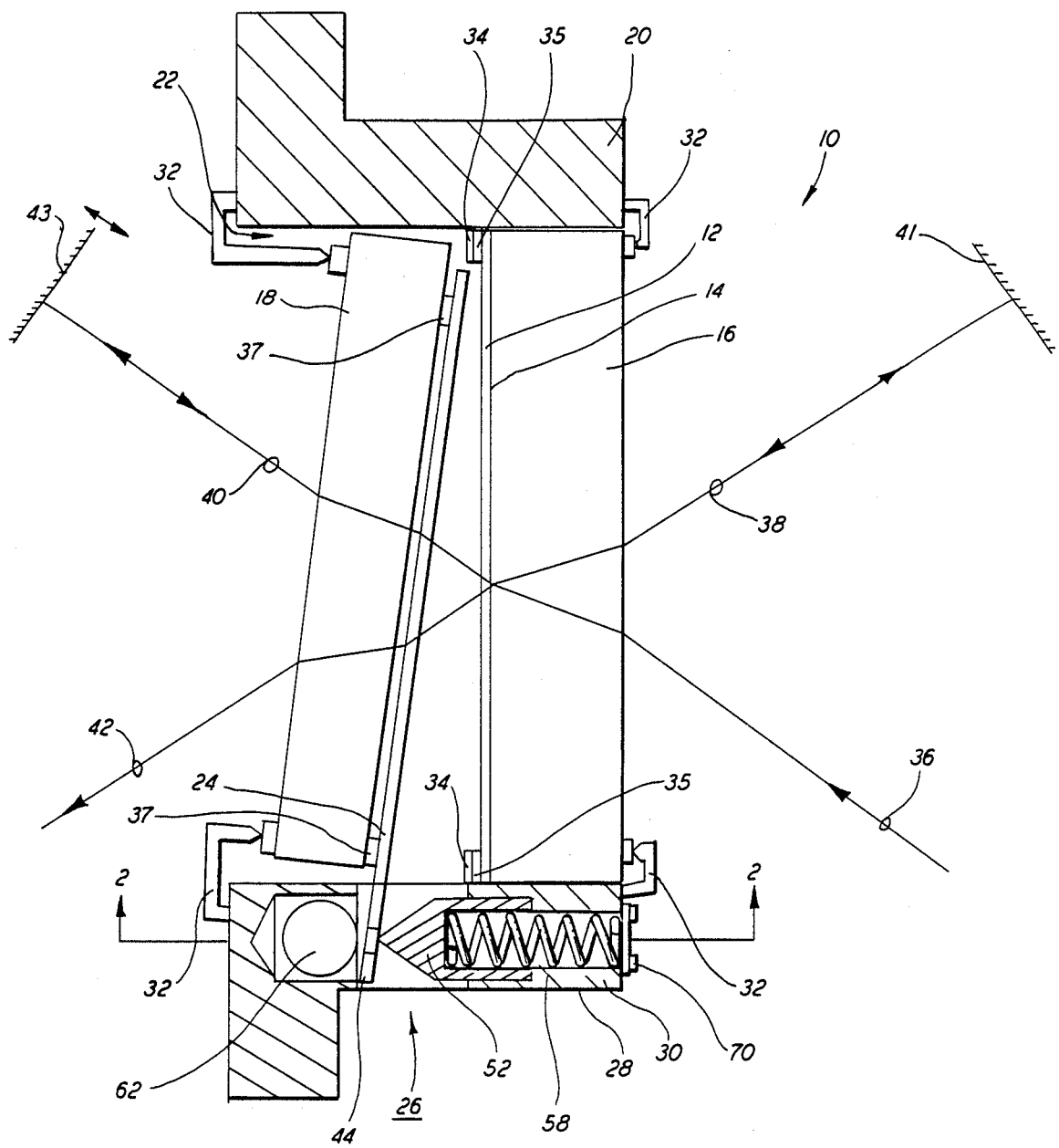
FIG. 1 which is a partial cross-sectional view of an assembly embodying the principles of the present invention.

An assembly, generally indicated at 10 in FIG. 1 and embodying the principles of the present invention, includes an optical beamsplitter 12 supported on a surface 14 of an optically transparent substrate 16. The assembly 10 also includes a compensator plate 18. The optically transparent substrate 16 carrying the beamsplitter 12 thereon and the compensator plate 18 are mounted in a housing 20 having an opening 22 therethrough. The assembly 10 further includes a compensator plate control member 24 which is positionally adjusted by a mechanism 26. Preferably, as more fully discussed below, the mechanism 26 is located within a segment 28 of the wall 30 of the housing 20. The assembly 10 additionally includes resilient mounting means 32 for securing the substrate 16 and the compensator 18 within the housing 20. In this embodiment the substrate 16 is secured against an inwardly projecting ridge 34 of the housing 20 via resilient pads 35. The compensator plate 18 is secured against the control member 24 via resilient pads 37.

The assembly 10 is hereinafter described in reference to the use thereof in a Fourier Transform Infrared (FT/IR) Spectrophotometer although such an assembly 10 has many other applications. In an FT/IR spectrophotometer an incident beam 36 of infrared light is directed through the substrate 16 to the beamsplitter 12. Upon striking the beamsplitter 12 the incident beam 36 is divided into a reflected beam 38 and a transmitted beam 40. Preferably, the reflected beam 38 and the transmitted beam 40 are equal in intensity. The relative intensity of the reflected beam 38 and the transmitted beam 40 is controlled by the composition and thickness of the beamsplitter 12. In this embodiment, the beamsplitter 12 is germanium which is deposited on the surface 14 of the substrate 16 to a thickness of about 1 micrometer. The reflected beam 38 passes back through the substrate 14 and is re-reflected by a fixed, or stationary mirror 41 back to the beamsplitter 12. The transmitted beam 40 passes through the compensator plate 18 and reflected by moving mirror 43, back through the compensator plate 18 to the beamsplitter 12 where it combines with the re-reflected beam 38 to form an exit beam 42.

From the above, it is readily apparent that the reflected beam 38 passes through the substrate 16 twice prior to combining to form the exit beam 42. The transmitted beam 40 passes through the compensator plate 18 twice prior to combining with the returned reflected beam 38 to form the exit beam 42. Consequently, any difference in the thicknesses of the substrate 16 and the compensator plate 18 is effectively doubled prior to the recombining of the reflected beam 38 and the transmitted beam 40 into the exit beam 42.

In the preferred embodiment both the compensator plate 18 and the substrate 16 are formed from material which is substantially transparent to infrared radiation. Further, it is preferred that the material of the compensator plate 18 and the material of the substrate 16 have identical optical characteristics. In particular, materials should have the same index of refraction for the range of wavelengths of interest. One such material, for example, which is commonly used is a potassium bromide (KBr) crystal. Additionally, the thickness of the compensator plate 18 and the substrate 16 are made relatively equal, however advantageously, by the use assembly 10, they need not be made exactly so. The reason for this is more fully explained below. Preferably however, the compensator plate 18 and the substrate 16 are about 55 millimeters in diameter and formed to a thickness of about 9.5 millimeters within a tolerance of ±0.2 millimeter. However, it is preferred that the compensator plate 18 be less than or equal to the thickness of the substrate 16 since the assembly 10, as shown, is designed to increase the light path therethrough. However, should the reverse be true then the entire housing 20 is rotated 180° with respect to the incident beam 36 and thereby effectively allows the pathlength to be reduced through the compensator plate 18 with respect to the substrate 16. Preferably the resilient mounts 32 are substantially in opposition to the pads 35 associated with the beamsplitter 12 and the pads 37 between the control member 24 and the compensator plate 18. Preferably the resilient pads 35 and 37 are formed from a polyester film to a thickness of about 7 or 8 micrometers.

Figure 3:
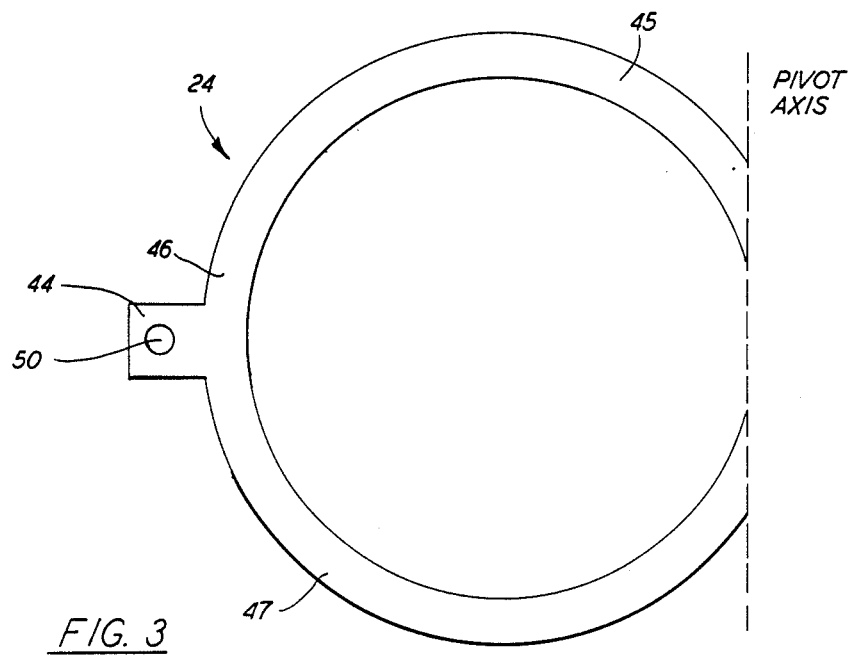
FIG. 3 which is a plane view of one element of the assembly of FIG. 1.

The assembly 10 includes a control member 24, shown in FIG. 3, generally formed in the shape of a "C". Preferably, but not necessarily, the member 24 is a frame of rigid steel, or like material, having first and second arms, 45 and 47 respectively, extending from a back portion 46. The frame member 24 includes a tab 44 extending from the back portion. A "C" shape is preferred for the member 24 so that the rotational force exerted thereon, as more fully explained below, is substantially equally distributed across the compensator plate 18 while nevertheless allowing the light beams of the interferometer to pass therethrough without distortion or interference. The compensator plate 18 is mounted in the housing 20 by resilient mounts 32 and held against the control member 24 thereby.

Figure 2:
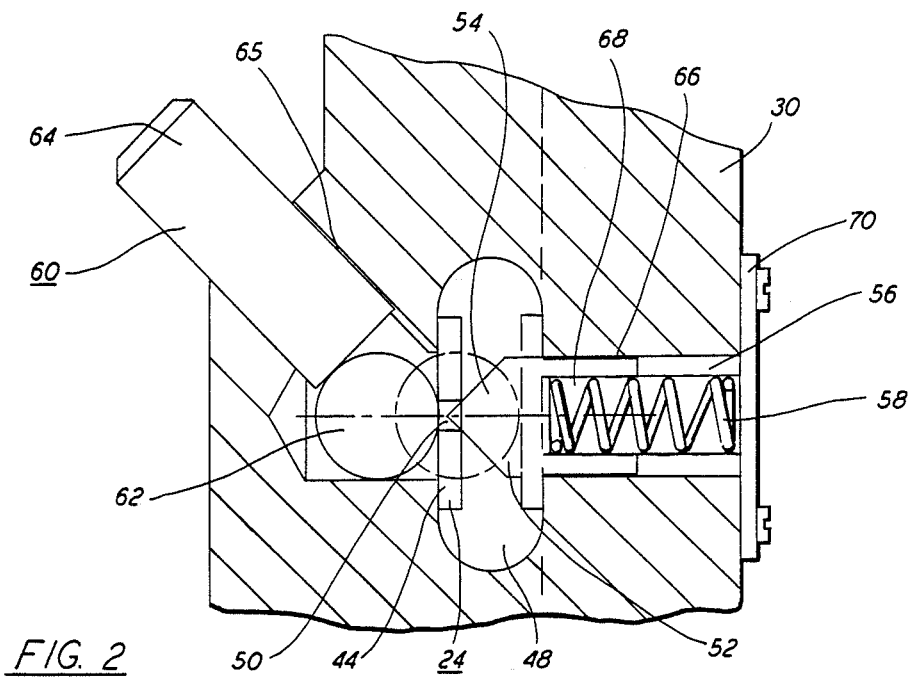
FIG. 2 which is a cross-sectional view of the assembly of FIG. 1 taken along the line 2—2 thereof.

Referring particularly to FIG. 2, the tab 44 of the control member 24 is shown to extend into a slot 48 penetrating into the wall 30 of the housing 20. The tab 44 preferably includes an opening 50, shown more clearly in FIG. 3, therethrough and is secured within the slot 48 by a spring biassed pin 52. The nib 54 of the pin 52 is formed small enough to fit into the opening 50 in the tab 44 and thereby retain the member 24 in proper position with respect to the slot 48. The pin 52 is located in a cylindrical chamber 56 defined by the wall 30 and is biassed by means of a spring 58. Preferably, the chamber 56 is formed perpendicular to the slot 48.

In order to adjust the position of the compensator plate 18, the biassing force of the spring 58 is countered by a counter force means 60. As shown in FIG. 2 the counter force means 60 includes a sphere 62 the position of which within the chamber 56 is controlled by an urging member 64 for example, a flat ended screw, passing through a threaded opening 65 in the wall 30. The opening 65 is found at an angle with the chamber 56 and transmits therein to ensure contact between the screw 64 and the sphere 62. The screw 64 is externally accessible with respect to the housing 20. Operationally, when the screw 64 is rotated clockwise into the chamber 56 the sphere 62 is urged to translate along the chamber 56 and operates to move the tab 44 against the bias of the spring 58. This results in the rotation of the compensator plate 18 toward the beamsplitter 12. The effective pivoting point about which the compensator plate 18 rotates is diametrically opposite the tab 44. The pivotal rotation is allowed due to the resilience of the mounting means 32. Thus, if the beamsplitter substrate 16 and compensator plate 18 are exactly the same thickness, the ideal position for the tab 44 is to the extreme right hand side of the slot 48 as shown in dotted lines in FIG. 2. However, since it would be extremely expensive and difficult to obtain such accuracy, the screw 64 is adjusted so as to pivot the compensator plate 18 with respect to the beamsplitter substrate 16 and thereby equalize the apparent distance that the reflected beam 38 and the transmitted beam 40 must travel.

The above described assembly 10 can be fabricated by use of known techniques. For example, the compensator plate 18 and beamsplitter 12 including the beamsplitter substrate 16 can be formed using known optical techniques including vapor deposition of germanium on the potassium bromide crystal beamsplitter substrate 16. The housing 20 can be formed from steel and, in the preferred embodiment, has an inside diameter on the order of about 56 millimeters and a wall thickness of about 6 millimeters. The chamber 56 can be drilled to an inside diameter of about 6 millimeters. Preferably, the control screw 64 is a 10/32. The sphere 62 and spring 58 are selected from commercially available items. The pin 52 is formed so as to accept a portion 66 of the spring 58 in a recess 68 therein. The nib 54 and opening 50 are cooperatively sized so that the nib 54 extends at least partially through the opening 50. In the preferred embodiment, the internally projecting ridge 34 is about 1 millimeter thick and hence the beamsplitter 12 is spaced apart from the plate 18 by about that same amount. The air gap between the beamsplitter 12 and the compensator plate 18 is minimized to reduce the space needed for the beamsplitter 12 within the instrument.

In order to fabricate the assembly 10 the sphere 62 is initially inserted into the chamber 56 after which the control member 24 is positioned with the tab 44 thereof penetrating into the slot 48. The spring loaded pin 52 is then inserted with its nib 54 facing the opening 50 of the tab 44. After the insertion of the spring 58 the chamber 56 is sealed by a closure member 70. The closure member 70 can be a plug or otherwise implemented using known techniques such as, for example, a plate secured by screws. Subsequently, the compensator plate 18 and the beamsplitter substrate 16 are mounted in the housing 20.

One major advantage of the assembly 10 is that the tolerances necessary to equalize the path lengths in an optical beamsplitter are reduced. By pivoting the compensating plate 18 with respect to the beamsplitter 12 the path length thereof can be made longer. Hence, the reflected beam 38 and the transmitted beam 40 travel exactly the same distances prior to reuniting to form the exit beam 42.

In operation, the adjustment is accomplished by initially positioning the compensator plate 18 substantially parallel with the substrate 16 and introducing an incident beam 36. Then, by observing the resulting interferogram generated by moving the movable mirror and detecting the output from the interferometer the plate 18 can be quite exactly positioned. Once set, this structure is generally free from alteration due to mechanical shock or vibration. Nevertheless, because of the readily accessible control mechanism the path length of the two arms of the interferometer can be adjusted by an operator without undue loss of operating time or expense.

The present invention has been described herein in terms of an exemplary embodiment which is not deemed limiting as other configurations or arrangements could be made by those skilled in the art and nevertheless remain within the scope hereof. Thus, the present invention is deemed limited only by the appended claims and the reasonable interpretation thereof.

What is claimed is:

1. An interferometer with an adjustable compensator plate which comprises:

an optical beamsplitter formed on an optically transparent substrate, said optical beamsplitter dividing an incident beam into first and second separated beams;

first and second mirrors defining first and second optical paths, respectively, for said first and second separated beams, respectively;

said first mirror moving cylically along said first optical path;

a pathlength compensator plate, of substantially the same index of refraction and substantially the same thickness as said optically transparent substrate, said pathlength compensator equalizing said first and second optical paths;

a housing receiving said optical beamsplitter in one end thereof and said pathlength compensator in the other end thereof; and adjusting and holding means for adjusting and holding the angular disposition of said compensator plate with respect to said beamsplitter to equalize said first and second optical paths;

said adjusting means comprising:

a pivotable frame member disposed between said pathlength compensator plate and said optical beamsplitter having a tab protruding therefrom;

said pivotable frame member being c-shaped with said tab protruding from the back of said c-shaped member;

said pivotable frame member being resiliently retained agianst the periphery of one face of said pathlength compensator plate;

a slot extending into a wall of said housing, said slot being cooperatively sized to accept said tab therein, said slot and said tab being relatively sized to permit said tab to translate therein;

means for biasing said tab against one end of said slot; and translating means for translating and holding said tab against biasing means.

2. An interferometer as claimed in claim 1 wherein said biasing means include:

said housing having a chamber therein intersecting said slot at one end thereof and closed at the other end thereof;

a pin having a first end and a second end, said pin being within said chamber and contacting said tab with said first end;

a spring having a first end and a second end, said first end of said spring abutting said closed end of said chamber;

said pin having a recess in the second end thereon, distal said tab, for accepting the second end of said spring.

3. An interferometer as claimed in claim 2 wherein said translating means includes:

said housing having an internally threaded opening therein intersecting said chamber at an angle thereto;

a sphere, said sphere being translatably positioned within said chamber, said sphere being spaced apart from said first end of said pin by said tab; and an externally threaded screw matching and penetrating into said internally threaded opening and contacting said sphere whereby whan said externally threaded screw is extended into said chamber via said internally threaded opening said sphere is urged against said tab.

* * * * *